United States Patent Office 3,801,581
Patented Apr. 2, 1974

3,801,581
α-PHENYL-FATTY ACIDS SUBSTITUTED BY AZACYCLOALKYL RESIDUES AND THEIR DERIVATIVES
Alberto Rossi, Oberwil, Basel-Land, Switzerland, assignor to Ciba-Geigy Corporation, Ardsley, N.Y.
No Drawing. Filed May 27, 1970, Ser. No. 41,107
Claims priority, application Switzerland, June 5, 1969, 8,650/69; Dec. 11, 1969, 18,441/69; Apr. 24, 1970, 6,221/70
Int. Cl. C07d 29/24, 29/30
U.S. Cl. 260—293.72        4 Claims

ABSTRACT OF THE DISCLOSURE

Compounds of the formula

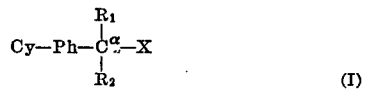

(I)

in which Cy is a 5- or 6-membered azacycloalkyl or azacycloalkenyl residue, of which the free valency extends from a carbon atom, Ph is a para-phenylene residue, $R_1$ and $R_2$ each represents a hydrogen atom or represents a monovalent, or together represent a divalent, hydrocarbon residue of aliphatic character, and X is a free or esterified carboxyl group or a converted carboxyl group, in which two hetero atoms, of which at least one is a nitrogen atom, are bound to the carbon atom of the converted carboxyl group, and their salts are useful as anti-inflammatory and antiphlogistic agents.

SUMMARY OF THE INVENTION

The present invention relates to new α-phenyl-fatty acids substituted by azacycloalkyl residues and their derivatives. More especially it concerns compounds of the formula

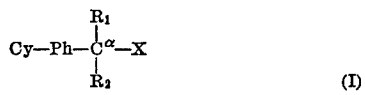

(I)

in which Cy is a 5- or 6-membered azacycloalkyl or azacycloalkenyl residue, of which the free valency extends from a carbon atom, Ph is a para-phenylene residue, $R_1$ and $R_2$ each represents a hydrogn atom or represents a monovalent, or together represent a divalent, hydrocarbon residue of aliphatic character, and X is a free or esterified carboxyl group or a converted carboxyl group, in which two hetero atoms, of which at least one is a nitrogen atom, are bound to the carbon atom of the converted carboxyl group, and their salts as well as pharmaceutical preparations containing those compounds and a process for treating inflammation which consists in administering such pharmaceutical preparations to a warm blooded being.

The residue Cy represents, more especially a pyrrolidinyl or pyrrolinyl residue or a piperidyl residue that may contain a single unsaturated bond. Pyrrolidinyl residues are 2- or 3-pyrrolidinyl residues. Pyrrolinyl residues are, for example, $\Delta^2$-2-pyrrolinyl residues, $\Delta^2$-3-pyrrolinyl residues or preferably $\Delta^3$-3-pyrrolinyl residues.

A piperidyl residue may be a 2- or 3-piperidyl residue, but is above all a 4-piperidyl residue. Any double bond that may be present in the ring preferably starts from the carbon atom that contains the free valency. Residues of this kind are, for example, 1,4,5,6-tetrahydro-2-pyridyl residues, 1,2,5,6-tetrahydro-3-pyridyl residues and especially 1,2,3,6-tetrahydro-4-pyridyl residues. Other piperidyl residues that may contain a single unsaturated bond are, for example, 1,2,3,6-tetrahydro-2-pyridyl residues and 1,2,3,6-tetrahydro-3-pyridyl residues.

The residue Cy may contain further substituents, especially at the nitrogen atom. As substituents at the nitrogen atom there come into consideration primarily acyl and hydrocarbon residues. Hydrocarbon residues are, for example, hydocarbon residues of aliphatic character such as those mentioned below, or aryl residues, such as naphthyl residues or above all, mono-nuclear aryl residues, such as phenyl residues. As acyl residues there are to be understood acyl residues derived from carboxylic acids, such as carbamyl residues, alkoxycarbonyl residues, the alkoxy residues being preferably those mentioned below, or above all residues of the formula $R_1''$—CO—, in which $R_1''$ is a hydrocarbon residue, for example, one of those mentioned above or mentioned below. Acyl residues of the formula $R_1''$—CO— are above all lower alkanoyl residues, for example, residues derived from the lower alkyl residues mentioned below, or benzoyl residues, which may contain substituents, for example, such as those given for the phenyl residues.

As substituents at the carbon atoms of the residues Cy there may be mentioned, for example, alkyl residues, such as lower alkyl residues, for example, those mentioned below. The carbon atoms of the ring that are vicinal to the nitrogen atom may be substituted more especially also by an oxo group, in each case only a single oxo group being present.

The para-phenylene residues Ph may be unsubstituted or may contain 1, 2 or more substituents. As substituents there may be mentioned, for example, the following: Alkyl residues, such as lower alkyl residues, especially those mentioned below, alkoxy residues, halogen atoms, trifluoromethyl residues, cyano, nitro, amino, and acylamino groups, especially lower alkanoylamino groups, such as acetylamino, or benzoylamino groups, hydroxyl, sulphamyl, free mercapto, alkylmercapto, alkylsulphonyl and alkylsulphinyl groups. In the last-mentioned substituents there are to be understood as alkyl residues above all lower alkyl residues, such as one of the residues mentioned below.

As hydrocarbon residues of aliphatic character there are to be understood those residues of which the first member bound to the substituted atom is not a member of an aromatic system, as in particular aliphatic, cycloaliphatic and araliphatic hydrocarbon residues.

Divalent hydrocarbon residues of aliphatic character are, for example, alkylidene residues, such as lower alkylidene residues, especially methylene or ethylidene residues, or alkylene residues, above all those containing 4–7, and especially 4 or 5, carbon atoms, such as 1,4-butylene, 1,5-pentylene, 1,4-pentylene, 1,6-hexylene or 1,7-heptylene residues.

As monovalent hydrocarbon residues of aliphatic character there come into consideration, for example, alkyl, alkenyl, alkinyl, cycloalkyl, cycloalkenyl, cycloalkyl-alkyl or cycloalkyl-alkenyl residues or cycloalkenyl-alkyl or cycloalkenyl-alkenyl residues or aralkyl or aralkenyl residues, such, for example, as phenyl-lower-alkyl or phenyl-lower-alkenyl residues, and especially the lower of the said hydrocarbon residues, such as residues containing one to eight carbon atoms. The phenyl-lower-alkyl and -alkenyl residues may be unsubstituted in the aromatic ring or substituted, for example, as stated for the phenyl residues.

Lower alkyl residues are, for example, methyl, ethyl, propyl or isopropyl residues or straight or branched butyl, pentyl or hexyl residues bound in any position.

Lower alkenyl residues are, for example, allyl or methallyl residues.

A lower alkinyl residue is above all a propargyl residue.

Cycloalkyl or cycloalkenyl residues are, for example, optionally lower alkylated cyclopentyl, cyclohexyl, cycloheptyl, cyclopentenyl, cyclohexenyl or cylcoheptenyl residues.

Cycloalkyl-alkyl residues or cycloalkyl-alkenyl residues are above all those containing lower alkyl or lower akenyl residues, especially those mentioned above and above all those containing the aforesaid cycloalkyl residues, such as 1- or 2-cyclopentyl-ethyl, 1-, 2- or 3-cyclohexyl-propyl, cycloheptyl-methyl or 1- or 2-cyclohexyl-ethenyl groups.

Cycloalkenyl-alkyl or cycloalkenyl-alkenyl residues are above all those containing lower alkyl or alkenyl residues, especially those mentioned above, and above all those containing the aforesaid cycloalkenyl residues, such as 1- or 2-cyclopent-3-enyl, 1- or 2-cyclohex-1-enyl-ethyl, cyclohept-1-enyl-methyl or 1- or 2-cyclohex-3-enyl-ethenyl groups.

As phenyl-lower-alkyl residues, there may be mentioned, for example, 1- or 2-phenylethyl residues or benzyl residues. Phenyl-lower-alkenyl residues are, for example, 1- or 2-phenylethenyl residues or cinnamyl residues.

Phenyl residues may be substituted or unsubstituted. As substituents there may be mentioned more epsecially alkyl residues, preferably lower alkyl residues, such as those mentioned above, trifluoromethyl groups, halogen atoms and alkoxy groups.

Alkoxy residues are above all lower alkoxy residues, for example, methoxy, ethoxy, propoxy, isopropoxy, butoxy or amyloxy groups, and as halogen atoms there may be mentioned above all fluorine, chlorine or bromine atoms.

Esterified carboxyl groups are more especially those esterified with aliphatic, cycloaliphatic or araliphatic alcohols. As ester-forming alcohols there may be mentioned more especially lower alkanols, cycloalkanols or phenylalkanols, which may contain further substituents, for example, methanol, ethanol, propanol, butanol, hexanols, cyclopentanols, cyclohexanols or substituted phenyl-lower-alkanols substituted, for example, in the ring in the manner mentioned above for phenyl residues, such as benzyl alcohols or phenyl-ethanols.

A converted nitrogen-containing carboxyl group X as mentioned above is, for example, a carbamyl group, a hydroxyaminocarbonyl group or a hydrazino-carbonyl group.

The new compounds possess valuable pharmacological properties, above all, a pronounced anti-inflammatory action as can be shown, for example, in the kaolin oedema test on the paws of rats in administering doses of 30–100 mg./kq. per os.

The new compounds are therefore useful as antiphlogistics. They are also valuable intermediate products for the manufacture of other useful substances, more especially pharmacologically active compounds.

Especially valuable are the compounds of the General Formula II

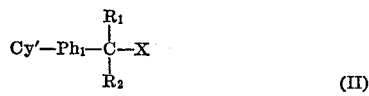
(II)

in which Cy' is a residue Cy containing no carbon-to-carbon double bonds in the ring, $R_1$, $R_2$ and X have the meanings given above, and $Ph_1$ is a para-phenylene residue, which is substituted by one or more lower alkyl or alkoxy residues, halogen atoms or trifluromethyl residues or is preferably unsubstituted.

Especially important are the compounds of the General Formula III

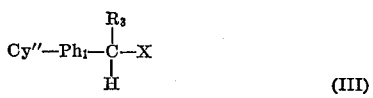
(III)

in which $Ph_1$ and X have the meanings given above, Cy' is a pyrrolidinyl or piperidyl residue which is substituted at the nitrogen atom by a lower alkyl, benzol or lower alkanoyl residue or is unsubstituted, and $R_3$ represents a hydrogen atom or above all a lower alkyl, alkenyl, cycloalkyl, or cycloalkyl-alkyl residue. Representatives of this class of compounds are for example α-[para-(1-acetyl-2-piperidyl)-phenyl]-propionic acid,
α-[para-(1-ethyl-4-piperidyl)-penyl]-propionic acid,
α-[para-(1-acetyl-3-piperidyl)-phenyl]-propionic acid and
α-[para-{1-(3,4,5-trimethoxybenzoyl)-4-piperidyl}-phenyl]-propionic acid.

Especially preferred on account of their good anti-inflammatory action are the compounds of the formula

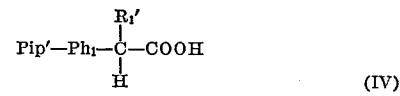
(IV)

in which $Ph_1$ has the meaning given above, Pip' is a 4-piperidyl residue, and $R_1'$ represents a hydrogen atom or preferably a lower alkyl or alkenyl residue.

Of importance are particularly compounds of the formula

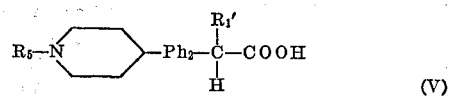
(V)

in which $R_1'$ has the meaning given above, $R_5$ is a hydrogen atom or preferably a lower alkanoyl residue, and $Ph_2$ is a para-phenylene residue, which may be substituted by methyl groups, methoxy groups, chlorine atoms or trifluoromethyl groups but is preferably unsubstituted.

Furthermore, of particular importance are compounds of the formula

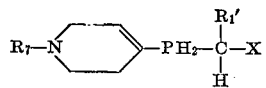

in which X, $Ph_2$ and $R_1'$ have the indicated meanings and $R_7$ represents hydrogen, a lower alkyl residue or preferably a lower alkanoyl residue or a benzoyl residue. As a representative of this class of compounds, α-[para-(1-acetyl-1,2,3,6-tetrahydro-4-pyridyl) - phenyl] - propionic acid may for example be mentioned.

Especially valuable are also compounds of the formula

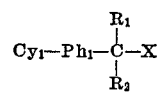

in which $Ph_1$, X, $R_1$ and $R_2$ have the meanings given above, and Cy is a 2-oxo-pyrrolidinyl or a 2-oxo-piperidyl residue, especially a 2-oxo-5-piperidyl residue. Noteworthy representatives of this class of compounds are for example α-[para-(1-methyl-2-oxo-5-piperidyl-phenyl]-propionic acid ethyl ester,
α-[para(1-methyl-2-oxo-4-pyrrolidinyl)-phenyl]-propionic acid,
α-[para-(1-acetyl-3-pyrrolidinyl-phenyl]-propionic acid,
α-[para-(1-methyl-2-oxo-6-piperidyl-phenyl]-propionic acid, and
α-[para-(1-methyl-2-oxo-5-piperidyl-phenyl]-propionamidoxime.

Especially valuable in this connection are compounds of the formula

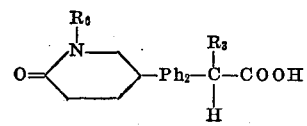

in which $Ph_2$ and $R_3$ have the meanings given above; and $R_6$ has the meaning given below.

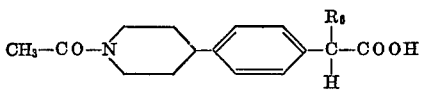

in which $R_6$ is a lower alkyl group, and above all the compound α-[para(1-methyl-2-oxo-5-piperidyl - phenyl]-propionic acid, and more especially α-[para-(1-acetyl-4-piperidyl-phenyl]-propionic acid of the formula

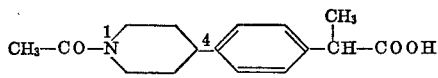

which latter compound, for example, in the kalolin oedema test on the paws of rats at an oral dose of 30–100 mg./kg. exhibits a distinctly anti-inflammatry action.

The new compounds can be obtained by methods in themselves known.

Thus, for example, a compound of the formula

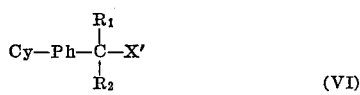

in which $X'$ is a cyano group and X, Cy, Ph, $R_1$ and $R_2$ have the meanings given above, is hydrolyzed or reacted with an appropriate alcohol or hydroxylamine.

The hydrolysis of the cyano group is carried out in the usual manner, for example, with alkaline agents, such as dilute aqueous alkalies, for example, sodium hydroxide, or especially acid agents, for example, dilute mineral acids, such as sulphuric acid or hydrochloric acid, and advantageously at a raised temperature.

The hydrolysis of cyano groups may, if desired, be carried only to the formation of the carbamoyl group. The hydrolysis in this case is advantageously carried out, for example, with sulphuric acid of 96% strength or weakly alkaline hydrogen peroxide, for example, rendered alkaline with caustic soda.

The reaction with the alcohol is carried out in the usual manner, advantageously in the presence of alkaline agents, such as an alkali metal salt, for example, a sodium salt of the alcohol, of preferably in the presence of acid agents, for example, hydrochloric acid or sulphuric acid, advantageously in the presence of ammonium chloride.

$X'$ may also stand for an acid halide such as a chloride or a bromide or anhydride group or a thio-ester group. The compounds of the Formula VI containing these groups may be hydrolysed or reacted with an alcohol, ammonia, hydrazine, hydroxylamine or a primary or secondary amine to give compounds of the Formula I. Hydrolysis or reaction with an alcohol may be performed for example as described above for the cyano compounds, reaction with an amine may be performed in the presence of a basic, organic or inorganic condensing agent, such as an alkali metal carbonate, for example, sodium or potassium carbonate, or a tertiary amine, such as pyridine.

Another process for making the new compounds consists in subjecting to rearrangement compounds of the formula

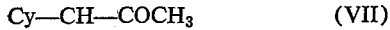

wherein Cy and Ph have the above meanings.

The rearrangement may be carried out according to Willgerodt-Kindler by reaction with ammonia or a primary or secondary amine, for example, morpholine, in the presence of sulphur, advantageously with the addition of an acid, for example, an aryl sulphonic acid such as a toluene sulphonic acid. If desired, primarly formed thioamides may be simultaneously or subsequently hydrolyzed to amides or carboxylic acids, for example, as states above.

It is within the scope of the invention to introduce, change or split off substituents present in the compounds obtained to suit the definition of the latter.

Thus, for example, free carboxyl groups, esterified carboxyl groups and nitrogen-containing converted carboxyl groups of the kind referred to above may be interchanged in the compounds obtained.

Esterified carboxyl groups, amidated carboxyl groups, i.e. carbamyl groups, hydroxy-amino-carbonyl groups and hydrazino-carbonyl groups can be converted into free carboxyl groups in the usual manner, for example, by hydrolysis, preferably in the presence of strong bases or mineral acids, for example, those mentioned above. If desired, the hydrolysis of carbamyl groups may be carried out in the presence of an oxidizing agent, such as nitrous acid.

Free or sterified carboxyl groups may also be converted in the usual manner into hydrazino-carbonyl groups, hydroxy-amino-carbonyl or carbamyl groups, for example, by reaction with hydrazine, hydroxylamine, ammonia or amines containing at least one hydrogen atom bound to the nitrogen atom and, if desired, dehydrating the intermediately formed hydrazonium, hydroxyl-ammonium or ammonium salt.

Free carboxyl groups may be esterified in the usual manner, for example, by reaction with an appropriate alcohol, advantageously in the presence of an acid, such as a mineral acid, for example, sulphuric acid or hydrochloric acid, or by reaction with a corresponding diazo-compound, for example, a diazo-alkane.

Free carboxyl groups may also be converted, for example, in the usual manner into acid halide or anhydride groups, for example, by reaction with halides of phosphorus or sulphur, such as thionyl chloride, phosphorus pentachloride or phosphorus tribromide, or reaction with acid halides, such as chloroformic acid esters. The acid anhydride or halide groups may then be converted in the usual manner by reaction with appropriate alcohols, if desired in the presence of acid-binding agents, such as organic or inorganic bases, for example, those mentioned above, or by reaction with hydroxylamine or ammonia, into esterified carboxyl groups, hydroxyamino-carbonyl groups or carbamyl groups.

Compounds obtained, which are not substituted at the nitrogen atom of the residue Cy, may be treated to introduce a substituent in that position. The introduction of a hydrocarbon residue of aliphatic character is carried out in the usual manner, especially by reaction with a reactive ester of an appropriate alcohol, for example, one of the above-mentioned esters, and preferably in the presence of an acid-binding agent, for example, a basic agent, such as one of those mentioned above, and especially potassium carbonate.

The introduction of an acyl residue may be carried out in the usual manner, more especially by reaction with an acid halide, such as acid chloride, or an anhydride. The reaction is carried out preferably in the presence of an acid-binding agent, for example, a basic agent, such as one of those mentioned above, or pyridine, or, when using an anhydride, catalytic amounts of an acid, such as sulfuric acid.

Conversely, in a compound obtained, which contains an acyl residue at the nitrogen atom of the residue Cy, this acyl residue may be split off by hydrolysis. This may be done, for example, in the presence of acid agents, for example, dilute mineral acids such as sulphuric acid or a hydrohalic acid, or preferably in the presence of basic agents, for example, alkali metal hydroxides such as sodium hydroxide.

In compounds obtained wherein the nitrogen atom of the residue Cy is substituted by an α-aralkyl residue, such as a benzyl residue, or an α-aralkoxy-carbonyl residue, such as a carbobenzoxy residue, these substituents can be split off, for example, by reduction with catalytically activated hydrogen, such as hydrogen in the presence of a hydrogenating catalyst, such as a palladium or platinum catalyst.

In the products obtained, substituents may be introduced into the para-phenylene residue and substituents on the residue may be converted into each other or split off, conventional methods being used throughout.

In compounds obtained, in which the grouping

and/or the ring of the residue Cy contains a double bond, this double bond may be hydrogenated. The hydrogenation is carried out in the usual manner, preferably by means of catalytically activated hydrogen, for example, as stated above.

The reactions referred to above may be carried out in the usual manner in the presence or absence of diluents, condensing agents and/or catalytic agents at a low, ordinary or raised temperature, optionally in a closed vessel and/or in an atmosphere of an inert gas. The conversions of products into final products can be carried out in any order to succession.

Depending on the conditions of the process and the starting materials used the final products are obtained in the free form or in the form of their salts which are likewise included in the invention. Compounds obtained in the free form which contain acid groups, such as carboxylic acids or hydroxamic acids, can be converted in the usual manner, for example, by reaction with appropriate basic agents, into salts with bases, above all into therapeutically useful salts with bases, for example, salts with organic amines, or metal salts. As metal salts there come into consideration above all alkali metal salts or alkaline earth metal salts, such as sodium, potassium, magnesium or calcium salts. From the salts the free compounds can be obtained in the usual manner, for example, by reaction with acid agents. Salts obtained with acids can be converted in a manner in itself known, for example, with alkalies or ion-exchangers, into the free compounds. From the latter salts can be obtained by reaction with organic or inorganic acids, and especially those capable of forming therapeutically useful salts. As such acids there may be mentioned, for example: hydrohalic acids, sulphuric acids, phosphoric acids, nitric acid, perchloric acid, aliphatic, alicyclic, aromatic or heterocyclic carboxylic or sulphonic acids, such as formic, acetic, propionic, succinic, glycolic, lactic, malic, tartaric, citric, ascorbic, maleic, hydroxy-maleic or pyruvic acid; phenyl-acetic, benzoic, para-amino-benzoic, anthranilic, para-hydroxybenzoic, salicyclic or para-amino-salicyclic acid, embonic acid, methane-sulphonic, ethane-sulphonic, hydroxyethane-sulphonic, ethylene sulphonic acid; halogen-benzene sulphonic, toluene sulphonic, naphthalene sulphonic acid or sulphanilic acid; methionine, tryptophan, lysine or arginine. The aforesaid salts or other salts can also be used for purifying the new compounds, for example, by converting the free compounds into their salts, isolating the salts, and again liberating the free compounds. Owing to the close relationship between the new compounds in the free form and in the form of their salts it is to be understood that references to the free compounds in the preceding and following description include also, when appropriate, the corresponding salts.

Depending on the choice of the starting materials and the method of operation and the number of asymmetrical carbon atoms, the new compounds may be present as optical antipodes, racemates or as mixtures of isomers (racemate mixtures).

When mixtures of isomers are obtained (racemate mixtures) the two stereoisomeric (diastereomeric) pure racemates can be separated from one another in known manner on the basis of the physical-chemical differences between the constituents, for example, by chromatography and/or fractional crystallization.

The racemates obtained can by known methods be split up into the antipodes, for example, by recrystallization from an optically active solvent, or with the aid of microorganisms, or by reaction with an optically active acid or base that forms a salt with the racemic compound, and separation of the salts so obtained, for example, on the basis of their different solubilities, and from which diastereomers the antipodes can be liberated by the action of suitable means. Especially useful optically active acids are, for example, the D- and L-forms of tartaric acid, di-o-toluyl-tartaric acid, malic acid, mandelic acid, camphor sulphonic acid or quinic acid. The preferred optically active bases are, for example, brucine, strychnine, morphine, menthylamine and α-phenyl-ethylamine or their quaternary ammonium bases. Advantageously the more active or less toxic of the two antipodes is isolated.

Alternatively, pure isomers, racemates or optical antipodes can be produced by using appropriate starting materials in the form of their pure isomers, racemates or optical antipodes.

The invention also includes any modification of the process in which there is used as starting material a compound obtainable as an intermediate product at any stage of the process and the remaining stages are carried out, or in which a starting material is formed under the conditions of the reaction, or in which one of the reaction components may be present in the form of a salt thereof.

There are advantageously used in carrying out the reactions in accordance with the invention those starting materials that lead to the formation of the groups of final products particularly mentioned in the opening part of this specification and especially to the specifically described or preferred end products.

The starting materials are known or, if they are new, can be obtained by methods in themselves known. The new starting materials are also included in the invention.

The new compounds can, for example, be used in the form of pharmaceutical preparations which contain the new compounds in their free form or if desired in the form of salts, thereof, especially alkali metal salts, or the therapeutically useful acid addition salts thereof, in a mixture with, for example, a pharmaceutical organic or inorganic, solid or liquid carrier material suitable for enteral, parenteral or topical administration. For preparing the carrier material substances should be used which do not react with the new compounds, for example, water, gelatine, lactose, starches, stearyl alcohol, magnesium stearate, talc, vegetable oils, benzyl alcohols, gums, propylene glycols, white petroleum jelly or other known carriers for medicaments. The pharmaceutical preparations may be in the form, for example, of tablets, dragées, capsules, suppositories, creams, salves or in liquid form as solutions (for example, as an elixir or syrup), suspensions or emulsions. If desired, they may be sterilized and/or may contain auxiliary substances, such as preserving, stabilizing, wetting or emulsifying agents, solution promoters or salts for regulating the osmotic pressure or buffers. They may also contain other therapetically valuable substances. The pharmaceutical preparations are made by the usual methods. The following examples illustrate the invention.

EXAMPLE 1

A solution of 12 grams of 1 - acetyl - 4 - [para-(1-cyanethyl) - phenyl] - piperidine and 6 grams of potassium hydroxide in 150 ml. of ethanol and 50 ml. of water is boiled for 24 hours under reflux, during which ammonia is evolved.

The reaction solution is evaporated in a rotary evaporator, the residue is dissolved in 200 ml. of water, and extracted with ether. The aqueous phase is treated with Norit, filtered off, adjusted to a pH-value of 2–3 with concentrated hydrochloric acid and evaporated in vacuo at 60° C. The viscous residue is dissolved in 50 ml. of ethanol and potassium chloride that separates out is filtered off. By evaporating the filtrate in vacuo there is obtained the crude hydrochloride of α-[para-(4-piperidyl)-phenyl]-propionic acid of the formula

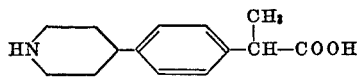

in the form of a viscous mass.

The 1-acetyl-4-[para-(1-cyanethyl)-phenyl]-piperidine used as starting material in this example is produced, for example, in the following manner:

To a solution of 23 grammes of 4-phenyl-piperidine in 200 ml. of absolute dioxan there are first added 15 grammes of pyridine, while stirring, and then 14.5 grammes of acetyl chloride are added dropwise. After evaporating the mixture in a rotary evaporator in vacuo, there is added ice and an aqueous solution of sodium carbonate, and the whole is extracted with ether. The ethereal extract is dried over sodium sulphate, and yields, after evaporation in vacuo, an oily residue which is distilled in a high vacuum. The resulting 1-acetyl-4-phenyl-piperidine has a boiling point of 134–136° C. (0.2 mm. of mercury).

To a solution of 22 grammes of this compound in 50 ml. of absolute carbon disulphide there are first added 12 grammes of acetyl chloride, then 50 grammes of aluminium chloride are added at room temperature in portions, while stirring energetically, the internal temperature rising to 40° C. and a viscous brown reaction mixture being formed. After it has been stirred for a further hour, the whole is poured onto ice and extracted with methylene chloride. The methylene chloride extracts are washed with a 2 N solution of sodium hydroxide and with water, and dried over sodium sulphate and evaporated. The solid residue so obtained yields, after recrystallization from a mixture of methylene chloride and ether, 1-acetyl-4-(para-acetyl-phenyl)-piperidine melting at 98–100° C.

To a solution of 20 grammes of the latter ketone in 100 ml. of methanol there is added dropwise, while stirring, at 10° C. a solution of 7 grammes of sodium borohydride in 50 ml. of methanol and 5 ml. of water. Fifteen minutes are allowed for further reaction, 200 ml. of water are added, and the mixture is extracted with methylene chloride. The methylene chloride extracts are washed with water, dried over sodium sulphate, and evaporated. The solid residue yields, after recrystallization from a mixture of ether and pentane, 1-acetyl-4-[para-(1-hydroxy-ethyl)-phenyl]-piperidine melting at 119–119.5° C.

20 ml. of thionyl chloride are slowly added to a solution of 20 grammes of the latter hydroxy-compound in 1000 ml. of absolute benzene, while stirring, at 50° C., and the whole is allowed to stand at room temperature for one hour. The mixture is then evaporated in vacuo, and the residue is taken up in ether and washed with ice-water. The ethereal extracts are dried over sodium sulphate, and evaporated in vacuo to yield crude 1-acetyl-4-[para-(1-chlor-ethyl)-phenyl]-piperidine in the form of a viscous oil. A solution of 22 grammes of this chloride in 50 ml. of dimethyl-sulphoxide is added dropwise, while stirring, to a suspension heated to 80–90° C. of 8 grammes of powdered dry sodium cyanide in 100 ml. of dimethyl-sulphoxide. When the addition is complete, the reaction mixture is maintained at the same temperature for a further two hours. The mixture is then cooled, 500 ml. of water are added, and the whole is extracted with ethyl acetate. The ethyl acetate extracts are dried over sodium sulphate, and evaporated in vacuo to yield crude 1-acetyl-4-[para-(1-cyanethyl)-phenyl]-piperidine in the form of a viscous oil (the infrared spectrum shows a nitrile band at 4.52μ).

The 1-acetyl-4-[para-(1-hydroxyethyl)-phenyl]-piperidine used in this example as an intermediate product for the preparation of the 1-acetyl-4-[para-(1-cyanethyl)-phenyl]-piperidine can also be obtained in the following manner:

To a well stirred suspension of 9.8 grammes of magnesium chippings, which have been washed with chloroform and activated with iodine, in 100 ml. of absolute tetrahydrofuran there is added dropwise at 60° C. a solution of 96 grammes of 2-(para-bromophenyl)-2-methyl-1,3-dioxolane in 100 ml. of absolute tetrahydrofuran. The rate of the drops is so regulated that the temperature does not exceed 60° C. after the reaction has begun. At the end the whole is heated for 30 minutes at 60° C., cooled to 5° C., and then there is added dropwise, while stirring, a solution of 70 grammes of 1-benzyl-4-piperidone in 100 ml. of absolute tetrahydrofuran. After heating the mixture for 1 hour at 40–50° C., the reaction mixture is filtered off and evaporated in a rotary evaporator in vacuo. To the residue there are added ice and a saturated aqueous solution of ammonium chloride. The whole is extracted with ether (total quantity 1500 ml.), dried over sodium sulphate, and concentrated by evaporation to two-thirds of its volume. Crystals are precipitated out by cooling the mixture in an ice bath, and the crystals are filtered off and recrystallized from ethanol to yield 2-[para-(1-benzyl-4-hydroxy-4-piperidyl)-phenyl]-2-methyl-1,3-dioxolane melting at 116–117° C. The hydrochloride of this compound melts at 240–241° C. with decomposition.

A solution of 110 grammes of the base so obtained in 500 ml. of concentrated hydrochlric acid is heated for 3 hours at 100° C. The mixture is cooled, its pH-value is adjusted to 9–10 with a 10 N solution sodium hydroxide, and extracted with chloroform. The chloroform extracts are washed with water, dried over sodium sulphate, and evaporated. The residue is dissolved warm in 500 ml. of ether. After cooling the solution, para-(1-benzyl-1,2,5,6-tetrahydro-4-pyridyl)-acetophenone melting at 99–100° C. crystallizes out.

A solution of 55 grammes of the latter compound in 400 ml. of glacial acetic acid is hydrogenated in the presence of 10 grammes of palladium-carbon (10% strength) at room temperature and atmospheric pressure until 3 equivalents of hydrogen have been consumed. The catalyst is removed by filtration, the filtrate is evaporated in vacuo, and there are added to the viscous residue ice and a 5 N solution of sodium hydroxide to produce a pH-value of 11. The mixture is extracted with methylene chloride, washed with water, dried over sodium sulphate, and evaporated in vacuo. The solid residue is recrystallized from a mixture of chloroform and petroleum ether, and there is obtained 1-hydroxy-1-[para-(4-piperidyl)-phenyl]-ethane melting at 132–133° C.

17 ml. of acetic anhydride are added dropwise at 40° C., while stirring, to a solution of 34 grammes of the latter compound in 200 ml. of ethyl acetate and 80 ml. of ether. After being stirred at that temperature for 1 hour, the mixture is cooled, then filtered, and ether and pentane are added to the filtrate until crystallization occurs. The crystals are filtered off and there is obtained 1-acetyl-4-[para-(1-hydroxyethyl)-phenyl]-piperidine melting at 119–120° C., which, in a mixed melting point test with the compound obtained by reduction of 1-acetyl-4-(para-acetyl-phenyl)-piperidine, shows no depression in melting point so that it is identical with the latter compound.

EXAMPLE 2

A solution of 10 grammes of α-[para-(4-piperidyl)-phenyl]-propionic acid in 100 ml. of absolute ethanol is saturated with dry hydrogen chloride at 80° C. After boiling this solution for a further hour under reflux, it is evaporated in vacuo and the residue is dissolved in ice-water and neutralized with an ice-cold saturated solution of sodium carbonate. The oil that separates is taken up in methylene chloride. The residue from the methylene chloride solution is crude oily α-[para-(4-piperidyl)-phenyl]-propionic acid ethyl ester of the formula

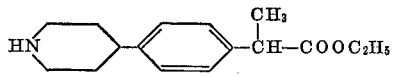

of which the infra-red spectrum shows a carbethoxy band at 5.8μ.

EXAMPLE 3

8 ml. of acetic anhydride are added to a solution of 11 grammes of α-[para-(4-piperidyl)-phenyl]-propionic acid ethyl ester in 100 ml. of ether, while stirring. After two hours the solution is washed with an ice-cold solution of sodium carbonate, then evaporated in a rotary evaporator, and there is obtained as residue the oily α-[para-(1-acetyl-4-piperidyl)-phenyl]-propionic acid ethyl ester of the formula

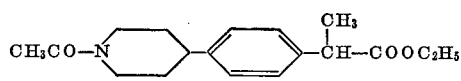

of which the infra-red spectrum shows an ester band at 5.78μ and an N-acetyl band at 6.1μ.

EXAMPLE 4

A solution of 25 grammes of α-[para-(1-acetyl-4-piperidyl)-phenyl]-propionic acid ethyl ester and 5 grammes of sodium hydroxide in 200 ml. of ethanol and 100 ml. of water is allowed to stand at room temperature for 3 hours. The greater part of the ethanol is then distilled off in vacuo in a rotary evaporator, and the aqueous solution is washed with ether, then rendered acid with 2 N hydrochloric acid, and extracted with ether. The ethereal extracts are dried over sodium sulphate, and evaporated. The solid residue is recrystallized from a mixture of methylene chloride and petroleum ether to yield α - [para-(1-acetyl-4-piperidyl)-phenyl]-propionic acid of the formula

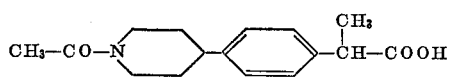

in the form of colorless crystals melting at 185–186° C. The sodium salt of this carboxylic acid is obtained in the following manner:

14.4 grammes of α-[para-(1-acetyl-4-piperidyl)-phenyl]-propionic acid are dissolved in 300 ml. of ethanol with the aid of heat. There is then added a solution of 1.2 grammes of sodium in 50 ml. of ethanol, to which 0.95 ml. of water has been added. In order to accelerate the crystallization of the sodium salt ether is added. The crystalline product is then filtered off, washed with ether, and dried in vacuo at 60° C.

EXAMPLE 5

Dry hydrogen chloride gas is introduced for 2 hours into a solution, cooled to −10° C. of 12 g. of 1-acetyl-2-[para-(1-cyanethyl)-phenyl]-piperidine in 100 ml. of absolute ethanol. The reaction solution is allowed to stand at room temperature for 16 hours, then evaporated under reduced pressure to two-thirds of its volume, treated with ice and 50 ml. of saturated sodium carbonate solution, then extracted with 2× 100 ml. of ether. The ethereal solution is washed with 100 ml. of saturated sodium chloride solution, extracted with 2× 200 ml. of an ice-cold solution of 10 ml. of concentrated sulfuric acid in 190 ml. of water. The acid solution is separated and heated at 70° C. in a water bath for 1 hour, during which crude α-[para-(1-acetyl-2-piperidyl)-phenyl]-propionic acid ethyl ester of the formula

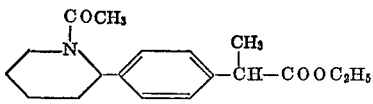

separates as an oil.

The 1 - acetyl-2-[para-(1-cyanethyl)-phenyl]-piperidine used as starting material in this example can be prepared as follows:

A solution of 19 g. of 2-phenyl-piperidine in 170 ml. of absolute dioxan is stirred, adding first 12.5 g. of pyridine, and then dropwise 12 g. of acetyl chloride. The batch is evaporated in a rotary evaporator under vacuum, and, after the addition of ice and aqueous sodium carbonate, extracted with ether. The ethereal extracts are dried over sodium sulfate, then evaporated in vacuo, when they yield an oily residue which is distilled in a high vacuum. The resulting 1-acetyl-2-phenyl-piperidine boils at 135–140° C. under a pressure of 0.2 mm. Hg.

A solution of 21.5 g. of this compound in 100 ml. of carbon disulfide is treated first with 12 g. of acetyl chloride, then while cooling and stirring vigorously, portionwise with 50 g. of aluminum chloride, the internal temperature rising at 35° C. The reaction solution is kept at this temperature for 1 hour, and the viscous reaction liquid is then poured on to ice and extracted with methylene chloride. The methylene chloride extracts are washed with 2 N sodium hydroxide solution and with water, dried over sodium sulfate, and evaporated. The resulting oily residue is distilled in a high vacuum and 1-acetyl-2-(para-acetyl-phenyl)-piperidine obtained which boils at 180–190° C. under a pressure of 0.1 mm. of Hg.

A solution of 20 g. of this ketone in 200 ml. of methanol is stirred at 0° C. while being treated with 40 ml. of water and then portionwise with 7 g. of sodium borohydride. The mixture is stirred for another hour at room temperature, then treated with 400 ml. of water and extracted with methylene chloride. The methylene chloride extracts are washed with water, dried over sodium sulfate, and evaporated. The oily residue is distilled in a high vacuum and yields 1 - acetyl-2-[para-(1-hydroxy-ethyl)-phenyl]-piperidine boiling at 150–160° C. under a pressure of 0.1 mm. of Hg.

A solution of 12 g. of this hydroxy compound in 300 ml. of benzene is heated quickly to 70° C. in the presence of 10 ml. of thionyl chloride and then allowed to stand at room temperature for 3 hours. The batch is then evaporated under reduced pressure, the residue is dissolved in ether, and the solution washed with ice water. The ethereal extracts are dried over sodium sulfate and on evaporation in vacuo yield crude 1-acetyl-2-[para-(1-chlorethyl)-phenyl]-piperidine in the form of a viscous oil.

A solution of 14 g. of this chloride in 100 ml. of dimethylsulfoxide is treated with 8 g. of sodium cyanide while stirring, and then heated at 90° C. for 2 hours. The reaction solution is allowed to stand at room temperature for 16 hours, then treated with 200 ml. of water, and extracted with ethyl acetate. The ethyl acetate extracts are dried over sodium sulfate and on evaporation under reduced pressure yield crude 1-acetyl-2-[para-(1-cyanethyl)-phenyl]-piperidine as a viscous oil which can be used as it is for the preparation of the afore-described ester.

EXAMPLE 6

A solution of 8 g. of α-[para-(1-acetyl-2-piperidyl)-phenyl]-propionic acid ethyl ester in 150 ml. of ethanol is treated with 80 ml. of N-sodium hydroxide solution and allowed to stand at room temperature for 3 hours. The solution is evaporated under reduced pressure, the residue is dissolved in water, the aqueous solution is filtered and acidified with 2 N hydrochloric acid, then extracted with ether. The ethereal solution is dried over sodium sulfate and evaporated under reduced pressure. The residue is recrystallized from ether+petroleum ether, and α-[para-(1-acetyl-2-piperidyl) - phenyl] - propionic acid of the formula

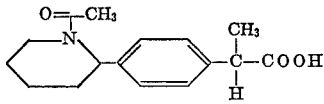

obtained as colorless crystals of melting point 151–153° C.

EXAMPLE 7

Dry hydrogen chloride gas is introduced for 1 hour into a solution, cooled to —10° C. of 3 g. of 1-methyl-2-oxo-5-[para-(1-cyanethyl)-phenyl]-piperidine in 20 ml. of ethanol. The reaction solution is allowed to stand at room temperature for 16 hours, then evaporated under reduced pressure to two-thirds of its volume, treated with ice and with 20 ml. of saturated sodium carbonate solution, and extracted with 3× 50 ml. of ether. The ethereal solution is washed with 50 ml. of saturated sodium chloride solution and extracted with an ice-cold solution of 5 ml. of concentrated sulfuric acid in 95 ml. of water in 2 portions. The acid extracts are separated and heated at 60° C. in a water bath for 1 hour, during which an oil separates. The batch is extracted with ether, the ethereal extract is dried over sodium sulfate and evaporated under reduced pressure to obtain α-[para-(1-methyl-2-oxo-5-piperidyl) - phenyl] - propionic acid ethyl ester of the formula

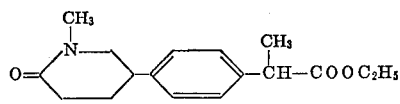

in the form of a faintly yellowish oil.

The 1-methyl-2-oxo-5-[para-(1-cyanethyl) - phenyl]-piperidine used as starting material can be prepared as follows:

A solution of 17.5 g. of 2-oxo-5-phenyl-piperidine in 300 ml. of absolute dioxan is heated to 40° C. and treated portionwise, while stirring, with 7.2 g. of sodium hydride (50% strength). Stirring is continued for another hour at this temperature, a thick precipitate forming. The batch in cooled to 40° C. and treated dropwise with 28.2 g. of methyl iodide, whereupon the precipitate passes into solution, and sodium iodide precipitates. Stirring is continued for another hour at 60° C., followed by filtration while the batch is still hot, and evaporation under reduced pressure. When the residue in recrystallized from ethyl acetate+petroleum ether, 1-methyl-2-oxo-5-phenyl-piperidine of melting point 103–105° C. is obtained.

A solution of 9.5 g. of this compound in 50 ml. of absolute carbon disulfide is treated first with 4.7 g. of acetyl chloride, then at room temperature portionwise with 23 g. of aluminum chloride while stirring vigorously and while cooling. The batch is stirred at room temperature for another 30 minutes, then poured onto ice, and extracted with methylene chloride. The methylene chloride extracts are washed with 2 N sodium hydroxide solution and with water, dried over sodium sulfate, and evaporated. The resulting solid residue is recrystallized from ethyl acetate+ether and 1-methyl-2-oxo-5-(para-acetyl-phenyl)-piperidine of melting point 107–108° C. obtained.

A solution of 5 g. of this ketone in 40 ml. of methanol is stirred at 5° C. while 10 ml. of water are added, followed by 1.5 g. of sodium borohydride. The reaction is allowed to continue for 30 minutes before 100 ml. of water are added and the batch is extracted with methylene chloride. The methylene chloride extracts are washed with water, dried over sodium sulfate, and evaporated. The solid residue in recrystallized from ethyl acetate+petroleum ether and 1-methyl-2-oxo-5-[para-(1-hydroxyethyl)-phenyl]-piperidine obtained which melts at 120–122° C.

A solution of 4.5 g. of this hydroxy compound in 20 ml. of absolute benzene is allowed to stand at room temperature for 2 hours in the presence of 2 ml. of thionyl chloride. The batch is evaporated under reduced pressure, the residue is treated with ice, neutralized with aqueous sodium carbonate solution, extracted with benzene, and evaporated under reduced pressure. 5 g. of the 1-methyl-2-oxo-5-[para-(1-chlorethyl)-phenyl]-piperidine so obtained are dissolved in 50 ml. of dimethylsulfoxide and treated at 50° C. while stirring with 2 g. of sodium cyanide. The batch is heated at 100° C. for 1 hour, then cooled, and treated with 100 ml. of water. The aqueous solution is extracted with methylene chloride, the organic extracts are dried over sodium sulfate, and evaporated. The solid residue is recrystallized from ethyl acetate+petroleum ether, and 1-methyl-2-oxo-5-[para-(1-cyanethyl)-phenyl]-piperidine obtained which melts at 114–116° C.

EXAMPLE 8

A solution of 2.5 g. of α-[para-(1-methyl-2-oxo-5-piperidyl)-phenyl]-propionic acid ethyl ester in 30 ml. of ethanol is mixed with 10 ml. of 2 N sodium hydroxide solution and the mixture allowed to stand at room temperature for 3 hours. It is then evaporated under reduced pressure, the residue is dissolved in water, filtered, and acidified with 2 N hydrochloric acid, then extracted with methylene chloride. The methylene chloride extracts are dried over sodium sulfate and evaporated in vacuo, and the residue recrystallized from ether+petroleum ether, and α-[para-(1 - methyl-2-oxo-5-piperidyl)-phenyl]-propionic acid of the formula

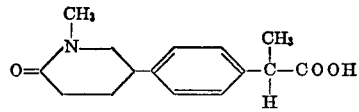

obtained as colorless crystals which melt at 181–182° C.

EXAMPLE 9

Dry hydrogen chloride gas is introduced for an hour and a half into a solution, cooled to —10° C. of 11 g. of 1-methyl-2-oxo-6-[para-(1 - cyanethyl)-phenyl]-piperidine in 120 ml. of absolute ethanol. The batch is allowed to stand at room temperature for 16 hours, then evaporated under reduced pressure, and the residue treated with 50 ml. of ice-cold 2 N sodium carbonate solution, and the solution extracted with 3× 150 ml. of ether. The ethereal extracts are washed with 100 ml. of ice-cold, saturated sodium chloride solution, then extracted with 2× 120 ml. of an ice-cold solution of 15 ml. of concentrated sulfuric acid in 105 ml. of water. The acid extracts are separated and heated at 60° C. for 30 minutes, during which an oil separates. The batch is extracted with ether, the extract is dried over sodium sulfate, and evaporated under reduced pressure. The oily residue is α-[para-(1-methyl-2-oxo-6-piperidyl)-phenyl]-propionic acid ethyl ester of the formula

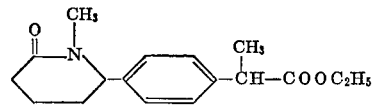

The 1-methyl - 2 - oxo-6-[para-(1-cyanethyl)-phenyl]-piperidine used as starting material in this example can be prepared as follows:

20 g. of 2-oxo-6-phenyl-piperidine are added to a suspension of 8.2 g. of sodium hydride (50% in oil) in 350 ml. of absolute dioxan, while stirring, and the mixture is then heated at 60° C. for 2 hours. The reaction solution is cooled to 40° C., then treated with 32 g. of methyl iodide, and stirred for another hour at 60° C. The precipitated sodium iodide is filtered off, and the solution evaporated under reduced pressure. The residue is recrystalized from ether+petroleum ether, and 1-methyl-2-oxo-6-phenyl-piperidine obtained which melts at 77–78° C.

A suspension of 92 g. of aluminum chloride in 200 ml. of carbon disulfide is mixed at room temperature, while stirring, with 36 g. of 1-methyl-2-oxo-6-phenyl-piperidine. The mixture is heated at 40° C. for a short while, then cooled to 20° C., and 20 g. of acetyl chloride are added dropwise. The mixture is heated at 40° C. for 2 hours, then cooled, and poured onto ice. The solution is extracted with methylene chloride, washed with 2 N sodium hydroxide solution and with water, dried over sodium sulfate, and evaporated under reduced pressure. The oily residue is the crude 1-methyl-2-oxo-6-(para-acetylphenyl)-piperidine.

To a solution, cooled to 0° C., of 40 ml. of water in 160 ml. of methanol are added first 7 g. of sodium borohydride, then, while stirring 20 g. of the afore-described keto compound, and the whole is stirred at room temperature for 1 hour. The batch is then treated with water, extracted with methylene chloride, washed with water, the organic extracts are dried over sodium sulfate, and evaporated in vacuo. The oily residue is distilled in a high vacuum and 1-methyl-2-oxo-6-[para-(1-hydroxyethyl)-phenyl]-piperidine obtained which boils at 170–175° C. under a pressure of 0.2 mm. of Hg.

A solution of 20 g. of this hydroxy compound in 400 ml. of absolute benzene is mixed with 15 ml. of thionyl chloride and allowed to stand at room temperature for 5 hours. On evaporation under reduced pressure, crude 1-methyl-2-oxo - 6 - [para-(1-chlorethyl)-phenyl]-piperidine is obtained as an oil. A solution of 22 g. of this chloride in 200 ml. of dimethylsulfoxide is treated with 10 g. of sodium cyanide and stirred while being heated at 90° C. for 2 hours. After cooling, 400 ml. of water are admixed, and the batch is extracted with a 1:1 mixture of ethyl acetate and ether. The organic extracts are dried over sodium sulfate and evaporated. The residue is dissolved in ether, a solid constituent not passing into solution. The ethereal solution is filtered off, evaporated in vacuo, and the oily residue is distilled in a high vacuum to obtain 1-methyl-2-oxo-6-[para-(1-cyanethyl)-phenyl]-piperidine of boiling point 180–200° C. (0.5 mm. of Hg) (IR spectrum: nitrile band at 4.48μ).

EXAMPLE 10

A solution of 8 g. of α-[para-(1-methyl-2-oxo-6-piperidyl)-phenyl]-propionic acid ethyl ester in 100 ml. of ethanol is mixed with 100 ml. of N sodium hydroxide solution, then allowed to stand at room temperature for 2 hours. The batch is evaporated under reduced pressure, the residue dissolved in water, the solution is filtered, and the filtrate acidified with 2 N hydrochloric acid and extracted with ether. When the ethereal extracts are dried over sodium sulfate and evaporated in vacuo, they yield an oily residue. A solution of the oil in ether is mixed with the calculated quantity of 10 N sodium hydroxide solution, while shaking, upon which the sodium salt of α-[para-(1 - methyl-2-oxo-6-piperidyl)-phenyl]-propionic acid of the formula

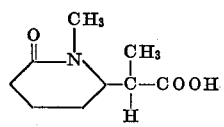

is obtained in the form of colorless crystals which do not melt up to 300° C.

EXAMPLE 11

A solution of 10 g. of 1-acetyl-3-[para-(1-cyanethyl)-phenyl]-piperidine in 150 ml. of ethanol is treated with a solution of 5 g. of KOH in 20 ml. of water, and the whole is refluxed for 15 hours. The batch is evaporated under reduced pressure, the residue is dissolved in water, and the solution extracted with ether. The alkaline aqueous solution is adjusted to pH 3 with concentrated hydrochloric acid, filtered and evaporated in vacuo until constant weight is achieved. The residue is dissolved in 50 ml. of absolute ethanol, filtered to remove insoluble potassium chloride, then evaporated under reduced pressure. The oily residue is α-[para-(3-piperidyl)-phenyl]-propionic acid hydrochloride of the formula

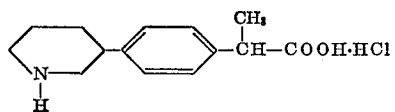

The 1-acetyl-3-[para-(1-cyanethyl)-phenyl]-piperidine used as starting material in this example can be prepared as follows:

17.5 g. of 2-oxo-5-phenyl-piperidine are added in small portions to a suspension of 5 g. of lithium aluminum hydride in 250 ml. of absolute dioxan while stirring at 80° C. The reaction is then allowed to continue at this temperature for 2 more hours. The batch is cooled in an ice-bath, treated dropwise with 20 ml. of water while stirring vigorously, then filtered, and the filtrate evaporated in vacuo. The residue is distilled in a high vacuum to obtain 3-phenyl-piperidine as a faintly yellow oil boiling at 100° C. under a pressure of 0.2 mm. of Hg.

A solution of 11.5 g. of this compound in 100 ml. of absolute dioxan is treated first with 7.5 g. of absolute pyridine, then dropwise while stirring with 7.25 g. of acetyl chloride. The reaction is allowed to proceed for another hour at room temperature and the batch then evaporated under reduced pressure, the residue treated with ice and aqueous sodium carbonate solution, and finally extracted with ether. The ethereal extracts are extracted by agitation with 2 N hydrochloric acid, the extracts are dried over sodium sulfate and evaporated in vacuo. The residue is distilled in a high vacuum and yields 1-acetyl-3-phenyl-piperidine which boils at 130–135° C. under a pressure of 0.2 mm. of Hg.

A solution of 11 g. of this compound in absolute carbon disulfide is treated first with 6 g. of acetyl chloride, then with 25 g. of aluminum chloride while cooling with ice and stirring vigorously. Stirring is continued at room temperature for 1 hour and then at 35° C. for 1 hour. The reaction mass is poured on to ice and extracted with methylene chloride. The organic extracts are dried over sodium sulfate and evaporated in vacuo, and the residue distilled in a high vacuum to obtain 1-acetyl-3-(para-acetyl-phenyl)-piperidine as a colorless oil which boils at 190° C. under a pressure of 0.1 mm. of Hg.

A solution of 12 g. of 1-acetyl-3-(para-acetylphenyl)-piperidine is added dropwise, while stirirng, to a solution, cooled to 0–5° C. of 3 g. of sodium borohydride in 100 ml. of methanol and 20 ml. of water. The reaction is allowed to proceed at 5° C. for 1 hour, and at room temperature for 5 hours. The batch is then evaporated, mainly under reduced pressure, treated with water, and extracted with methylene chloride. The methylene chloride solution is dried over sodium sulfate and evaporated in vacuo, and the residue is distilled in a high vacuum to obtain 1-acetyl-3-[para-(1-hydroxyethyl)-phenyl]-piperidine boiling at 190 C. under a pressure of 0.1 mm. of Hg.

A solution of 13 g. of this hydroxy compound in 300 ml. of absolute benzene is stirred while being slowly mixed with 10 ml. of thionyl chloride, and then heated at 80° C. for half an hour. The batch is evaporated in vacuo and the viscous residue is treated with ice and aqueous saturated sodium carbonate solution, and extracted with ether. The ethereal extract is dried over sodium sulfate and evaporated to give crude 1-acetyl-3-[para-(1-chloroethyl)-phenyl]-piperidine as a reddish oil.

A solution of 10 g. of this chloride in 100 ml. of dimethylsulfoxide is treated with 5 g. of sodium cyanide while stirring. The batch is heated at 90° C. for 2 hours, then cooled to room temperature, 200 ml. of water are added and the batch is extracted with ethyl acetate. The ethyl acetate extracts are dried over sodium sulfate and evaporated under reduced pressure. They yield crude 1-acetyl-3-[para-(1-cyanethyl)-phenyl]-piperidine (IR spectrum: nitrile band at 4.5µ).

EXAMPLE 12

Dry hydrogen chloride gas is introduced for 1 hour at 80° C. into a solution of 7 g. of α-[para-(3-piperidyl)-phenyl]-propionic acid hydrochloride in 30 ml. of ethanol. The batch is kept at this temperature for another 30 minutes, then evaporated under reduced pressure, the residue is dissolved in ice-cold water and the solution treated with aqueous sodium carbonate solution. The alkaline aqueous phase is extracted with ether, the ether dried over sodium sulfate and evaporated. The oily residue, on distillation in a high vacuum, yields α-[para-(3-piperidyl)-phenyl]-propionic acid ethyl ester of the formula

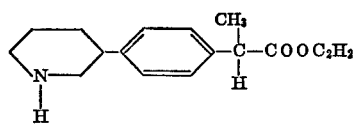

in the form of a viscous oil boiling at 130° C. under a pressure of 0.1 mm. Hg.

EXAMPLE 13

A solution of 3.5 g. of α-[para-(3-piperidyl)-phenyl]-propionic acid ethyl ester in 100 ml. of absolute benzene is mixed with 3.5 ml. of absolute pyridine and then dropwise with 3.4 g. of acetic anhydride while stirring. The reaction is allowed to proceed for another hour at room temperature, the batch is then evaporated under reduced pressure, the residue is treated with ice and sodium carbonate, and extracted with ether. The ethereal extracts are extracted with 2× 10 ml. of 2 N hydrochloric acid, dried over sodium sulfate, and evaporated in vacuo. The oily residue yields crude α-[para-(1-acetyl-3-piperidyl)phenyl]-propionic acid ethyl ester of the formula

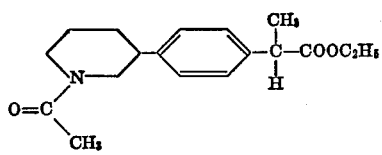

as a faintly yellow oil.

EXAMPLE 14

A solution of 3.5 g. of α-[para-(1-acetyl-3-piperidyl)-phenyl]-propionic acid ethyl ester in 20 ml. of ethanol is mixed with 5 ml. of 5 N sodium hydroxide solution and allowed to stand at room temperature for 3 hours. The batch is evaporated under reduced pressure, treated with water, extracted with ether, and the alkaline aqueous layer is acidified with 2 N hydrochloric acid. The batch is extracted with ether, and the ethereal extracts dried over sodium sulfate and evaporated under reduced pressure. The residue is recrystallized from benzene and yields α-[para-(1 - acetyl-3-piperidyl)-phenyl]-propionic acid of the formula

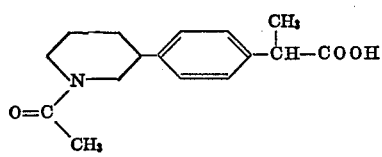

in the form of colorless crystals of melting point 170–172° C.

EXAMPLE 15

A solution of 4.8 g. of hydroxylamine hydrochloride in 15 ml. of water is diluted with 200 ml. of ethanol and then mixed with a solution of 3.9 g. of anhydrous sodium carbonate in 50 ml. of water. There are added 7.5 g. of 1-methyl-2-oxo-5-[para-(1 - cyanethyl)-phenyl]piperidine, and the whole is refluxed for 3 hours. The bulk of the ethanol is distilled off under reduced pressure, an oil precipitating. The oil is dissolved in ether, the ethereal layer washed with water, dried over sodium sulfate, and evaporated under reduced pressure. The solid residue is recrystallized from chloroform+petroleum ether and yields α-[para-(1-methyl-2-oxo - 5 - piperidyl)-phenyl]-propionamidoxime of the formula

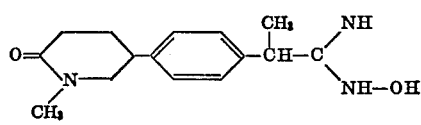

in the form of colorless crystals of melting point 176–178° C.

EXAMPLE 16

To a solution of 6 g. of α-[para-(4-piperidyl)-phenyl]-propionic acid ethyl ester in 100 ml. of absolute dioxan are added while stirring, first 2.2 g. of pyridine, then 6.5 g. of 3,4,5-trimethoxybenzoyl chloride, and the mixture is allowed to react for 3 hours at room temperature, the pyridine hydrochloride precipitating. The batch is finally evaporated in vacuo, the residue treated with ice, and extracted with ether. The ethereal extracts are washed with N hydrochloric acid and with water, dried over sodium sulfate, and evaporated in vacuo. The oily residue is α-[para-{1-(3,4,5-trimethoxy-benzoyl) - 4 - piperidyl}-phenyl]-propionic acid ethyl ester of the formula

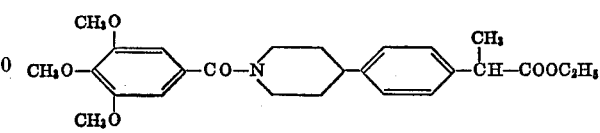

EXAMPLE 17

A solution of 12 g. of α-[para-{1-(3,4,5-trimethoxybenzoyl)-4-piperidyl}-phenyl]-propionic acid ethyl ester in 50 ml. of ethanol is mixed with a solution of 1.5 g. of sodium hydroxide in 20 ml. of water and the mixture allowed to stand at room temperature for 1 hour. The bulk of the ethanol is distilled off under reduced pressure, the remainder is treated with water, filtered through diatomaceous earth (Hyflo), and acidified with 2 N hydrochloric acid. The precipitate which forms is dissolved in chloroform, the chloroformic solution is dried over sodium sulfate and evaporated under reduced pressure. On recrystallization from chloroform+ether the residue yields α-[para-{1-(3,4,5-trimethoxybenzoyl)-4-piperidyl}-phenyl]-propionic acid of the formula

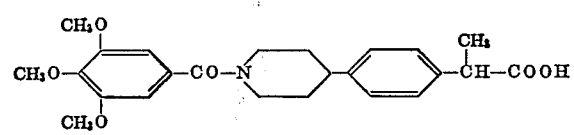

in the form of colorless crystals of melting point 186–188° C.

EXAMPLE 18

A mixture of 30 g. of para-(1-acetyl-4-piperidyl)-acetophenone, 16 g. of morpholine and 6 g. of sulfur is heated at 140° C. for 2 hours. After that it is diluted while still warm with 150 ml. of ethanol, treated with ether until it begins to become turbid, and allowed to stand at 0° C. for some time until pale yellow crystals precipitate.

On recrystallization from methylene chloride+ether, para-(1-acetyl-4-piperidyl)-phenyl-thioacetic acid morpholide of the formula

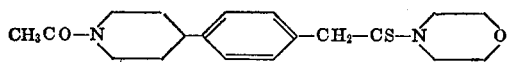

melting at 142–144° C. is obtained.

EXAMPLE 19

A solution of 20 g. of para-(1-acetyl-4-piperidyl)-phenyl-thioacetic acid-morpholide in 100 ml. of glacial acetic acid is mixed with 5 ml. of concentrated sulfuric acid and 10 ml. of water, and the mixture refluxed for 15 hours. After cooling, the sulfuric acid is neutralized with 5 N sodium hydroxide solution, then the batch is evaporated to dryness under reduced pressure. The residue is dissolved in a small amount of water and the pH adjusted to 7–8 with 2 N sodium hydroxide solution. The aqueous solution is evaporated to dryness, mixed with acetone, and the precipitate which forms is filtered off. The acetonic solution is evaporated under reduced pressure, the residue dissolved in a small amount of ethanol and acidified with alcoholic hydrochloric acid to pH 2. When ether is added and the mixture allowed to stand at room temperature, para-(4-piperidyl)-phenylacetic acid hydrochloride of the formula

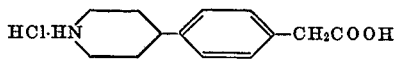

forms colorless crystals of melting point 170–172° C.

EXAMPLE 20

Tablets containing 100 mg. of α-[para-(1-acetyl-4-piperidyl)-phenyl]-propionic acid may be prepared with the following ingredients:

| | Per tablet, mg. |
|---|---|
| α-[Para-(1-acetyl - 4 - piperidyl)-phenyl]-propionic acid | 100 |
| Lactose | 50 |
| Wheat starch | 73 |
| Colloidal silicic acid | 13 |
| Talc | 12 |
| Magnesium stearate | 2 |
| | 250 |

Method.—The active substance is mixed with the lactose, part of the wheat starch, and with colloidal silicic acid, and the mixture passed through a sieve. Another portion of the wheat starch is pasted with the five-fold quantity of water on a water bath, and the powder mixture is kneaded with the paste until a slightly plastic mass is obtained. The mass is forced through an about 3 mm. mesh sieve, dried, and the dry granulate is again passed through a sieve. Then the remainder of the wheat starch, talc and magnesium stearate are admixed. The resulting mixture is compressed into tablets of 250 mg. each.

EXAMPLE 21

In an analogous manner as described in the Examples 1–19 there may be prepared also the following compounds:

α-[meta-chloro-para-(1-benzoyl-2-pyrrolidinyl)-phenyl]-butyric acid methyl ester,
α-[ortho-methoxy-para-(1-benzyl-3-pyrrolidinyl)-phenyl]-isobutyric acid amide,
α-[meta-hydroxy-para-(1-alkyl-Δ²-4-pyrrolinyl)-phenyl]-β-cyclophenyl-propionic acid,
α-[ortho-ethylsulfonyl-para-(1-cyclohexyl-Δ²-2-pyrrolinyl)-phenyl]-β-phenyl-propionic acid isopropyl ester,
α-[ortho, meta-difluoro-para-(1-cyclopentylmethyl-Δ³-2-pyrrolinyl)-phenyl]-β-(p-chlorophenyl)-propionic acid hydrazide,
α-[meta, meta'-dichloro-para-(1-carbamyl-Δ³-3-pyrrolinyl)-phenyl]-β-(ortho-methoxyphenyl)-propionic acid dimethylamide,
α-[meta-cyano-para-{1-(para-chlorobenzyl)-2-oxo-3-methyl-5-pyrrolidinyl}-phenyl]-acrylic acid morpholide,
1-[meta-mercapto-para-(1-methoxycarbonyl-1,2,3,4-tetrahydro-6-pyridyl)-phenyl]-cyclohexane-1-carboxylic acid,
α-[meta-methylsulfinyl-para-(1-propionyl-1,2,3,6-tetrahydro-5-pyridyl)-phenyl]-β-(1-cyclohexenyl)-propionic acid cycloheptyl ester,
α-[meta-(4-bromophenylamino)-para-{1-(2-methylbenzoyl)-3-methyl-1,2,3,4-tetrahydro-4-pyridyl}-phenyl]-vinylacetic acid ethylamide,
α-[ortho-acetylamino-para-(1-cycloheptyl-1,2,3,6-tetrahydro-3-pyridyl)-phenyl]-ethynylacetic acid,
α-[meta-trifluoromethyl-para-{1-(3-methoxybenzyl)-1,2,3,4-tetrahydro-2-pyridyl}-phenyl]-α-cyclohexyl-propionic acid,
α-[meta-amino-para-{1-(2-fluorobenzoyl)-1,2,3,4-tetrahydro-5-pyridyl}-phenyl]-α-(1-cyclopentenyl)-propionic acid benzyl ester,
α-[meta-methyl-para-(1-isopropyl-1,2,3,4-tetrahydro-2-pyridyl)-phenyl]-γ-cyclopentyl-vinylacetic acid piperidide,
α-[meta-nitro-para-{1-(3-trifluoromethyl-4-chlorobenzyl)-1,2,3,6-tetrahydro-6-pyridyl}-phenyl]-γ-(4-chlorophenyl)-vinylacetic acid pyrrolidinide,
α-[meta-benzoylamino-para-(1-cyclohexyl-2-ethyl-1,2,3,4-tetrahydro-3-pyridyl)-phenyl]-γ-(1-cyclohexenyl)-vinylacetic acid para-chlorobenzyl ester,
α-[meta-methylmercapto-para-(1-phenethyl-2-oxo-4-pyrrolidinyl)-phenyl]-isovaleric acid,
α-[meta-sulfamyl-para-(1-benzoyl-1,2,3,6-tetrahydro-4-pyridyl)-phenyl]-propion-hydroxamic acid,
α-[para-(1-ethyl-2-oxo-3-piperidyl)-phenyl]-isobutyric acid isopropyl amide,
α-[ortho-bromo-para-(1-methyl-2-oxo-3-pyrrolidinyl)-phenyl]-propionic acid, and
α-[meta-ethoxy-para-(1-isopropyl-2-oxo-4-piperidyl)-phenyl]-valeric acid.

What is claimed is:
1. A member selected from the group consisting of compounds of the formula

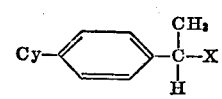

in which Cy stands for a member selected from the group consisting of 2-piperidyl, 3-piperidyl, 4-piperidyl, 1-acetyl-2-piperidyl, 1-acetyl-3-piperidyl and 1-acetyl-4-piperidyl and X stands for a member selected from the group consisting of carboxy and carboethoxy, and a therapeutically acceptable salt thereof.

2. A compound as claimed in claim 1, said compound being α-[para-(1-acetyl - 4 - piperidyl)-phenyl]-propionic acid or a therapeutically acceptable salt thereof.

3. A compound as claimed in claim 1, said compound being para-(1-acetyl-4-piperidyl)-phenyl-acetic acid, or a therapeutically acceptable salt thereof.

4. A compound as claimed in claim 1, said compound being para-(4-piperidyl)-phenyl-acetic acid, or a therapeutically acceptable salt thereof.

(References on following page)

References Cited

UNITED STATES PATENTS

| | | | |
|---|---|---|---|
| Re. 26,655 | 8/1969 | Sherlock et al. | 260—295.5 R |
| 3,558,641 | 1/1971 | Sarett et al. | 260—295 R |
| 3,546,237 | 12/1970 | Doyle et al. | 260—295 R |
| 3,454,587 | 7/1969 | Littell et al. | 260—295.5 R |
| 3,449,349 | 6/1969 | Shen et al. | 260—295 R |
| 3,125,488 | 3/1964 | Biel | 260—295 R |
| 3,218,328 | 11/1965 | Shapiro et al. | 260—294.3 |
| 3,349,091 | 10/1967 | Chinn | 260—294 |
| 3,452,079 | 6/1969 | Shen et al. | 260—471 |

OTHER REFERENCES

Denss Rolf et al.: Chemical Abstracts, vol. 79, pp. 96611–12 (1969).

NICHOLAS S. RIZZO, Primary Examiner

J. TOVAR, Assistant Examiner

U.S. Cl. X.R.

260—247.1, 247.5 R, 295 R, 295 K, 295.5 R, 295.5 A, 326.3; 424—267